United States Patent [19]

Hakimi et al.

[11] Patent Number: 5,587,827

[45] Date of Patent: Dec. 24, 1996

[54] APPARATUS FOR COMPENSATING CHROMATIC AND POLARIZATION DISPERSION AND FREQUENCY CHIRP IN FIBER OPTICS AND FOR PULSE COMPRESSION IN LASER SYSTEMS

[76] Inventors: Hosain Hakimi; Farhad Hakimi, both of 131 Coolidge Ave., #627, Watertown, Mass. 02172

[21] Appl. No.: 381,741

[22] Filed: Feb. 1, 1995

[51] Int. Cl.$^6$ .................................................. G02F 1/03
[52] U.S. Cl. ........................... 359/249; 372/29; 372/30
[58] Field of Search ................................. 359/249, 498, 359/499; 372/30, 29

[56] References Cited

U.S. PATENT DOCUMENTS

| | | | |
|---|---|---|---|
| 4,261,639 | 4/1981 | Kogelnik et al. | 350/96.15 |
| 4,565,426 | 1/1986 | Cullen | 350/401 |
| 5,119,216 | 6/1992 | Wada et al. | 359/53 |
| 5,185,827 | 2/1993 | Poole | 385/28 |
| 5,259,048 | 11/1993 | Ozeki | 358/31 |
| 5,261,016 | 11/1993 | Poole | 385/28 |

OTHER PUBLICATIONS

Cimini et al, IEEE Journal of Lightwave Tech. vol. 8, p. 649, 1990.
Gnauck et al, IEEE Photonics Tech. Letters, vol. 5, No. 6, p. 663, 1993.
Treacy, IEEE Journal of Quantum Electronics, vol. 5, p. 454, 1969.

*Primary Examiner*—Georgia Y. Epps
*Assistant Examiner*—Thomas Robbins

[57] ABSTRACT

Chromatic and polarization dispersion and transmitter frequency chirp are the dominant data rate limiting factors for high-speed, long distance communication systems. To overcome such limitations, a chromatic and polarization dispersion and frequency chirp compensator is utilized. The applicants provide a compensator by combining a wavelength to polarization transformer with a polarization to delay converter having a dispersion characteristic of substantially equivalent in magnitude, and opposite in sign, to the desired amount of dispersion and frequency chirp to be compensated. Optical gain may be incorporated in any of the elements of the compensator which makes the present invention a lightwave amplifier as well as a dispersion compensator. The present invention is also applicable as an optical pulse time compressor that compresses a relatively long width optical pulse to a short width pulse.

9 Claims, 5 Drawing Sheets

APPARATUS FOR COMPENSATING CHROMATIC AND POLARIZATION DISPERSION AND FREQUENCY CHIRP IN FIBER OPTICS AND FOR PULSE COMPRESSION IN LASER SYSTEMS

BACKGROUND OF THE INVENTION

The present invention relates to compensation of chromatic and polarization dispersion and transmitter frequency chirp in fiber optical communication systems in order to increase the data rate. The invention is applicable to optical pulse time compression for producing short pulses from a long chirped pulses. The invention is also relevant to stretchers and compressors for distortionless amplification of short optical pulses.

One of the major applications of single-mode fiber concerns telecommunication, particularly, for trunk networks, where long-haul high-data-rate links predominate. Millions of kilometers of single-mode optical fibers are already installed throughout the world. Most of the single-mode fibers installed have high chromatic dispersion which limits the speed of intensity-modulated direct-detection optical fiber communication links. There are, currently, single-mode fibers available with less chromatic dispersion suitable for ultrahigh-speed long distance optical communication systems. However, the cost of removing the old fiber cables and installing new ones is prohibitive. Therefore, it is highly economical to increase the usable bandwidth of existing installed fibers without installing new ones.

Fiber loss and dispersion are two fundamental limiting factors in bandwidth of intensity-modulated direct-detection optical fiber communication system. With recent advent of rare earth optical amplifiers, dispersion of single-mode fiber has become the dominant limitation for ultrahigh-speed long distance optical communication systems. There are two major contributions to dispersion, chromatic and polarization. Chromatic dispersion causes pulse broadening due to unequal speed of different wavelength components of light pulse in the fiber. Polarization mode dispersion arises in single-mode fiber when the combined effects of non-symmetric internal stresses and noncircularity of the waveguide geometry created during manufacture cause the two polarization modes of the waveguide to propagate with different group velocities. Polarization mode dispersion like chromatic dispersion broadens the optical pulse in optical fibers.

Diode lasers may produce a frequency chirped optical pulse upon pulsed excitation. Each wavelength (frequency) components of a chirped optical pulse are emitted in different time, hence, causing different delays for every wavelength. Therefore, a chirped optical pulse resembles a dispersion broadened optical pulse where every wavelength component has experienced different delays. In long distance optical communication systems, dispersion degrades system performance by either limiting the maximum data rate or by requiring a shorter distance between repeaters.

To upgrade existing networks based on standard single-mode fiber, several all-optical dispersion compensation techniques have been proposed. Approaches described in U.S. Pat. Nos. 5,185,827 and 5,261,016, utilize a spatial mode converter with a dispersive waveguide having an opposite dispersive characteristic to balance the unwanted chromatic dispersion. Disadvantage of these techniques is excessive loss due to mode conversion and long length of dispersive waveguide for commercial systems.

Another method as described in U.S. Pat. No. 4,261,639, involves the interconnection of two optical fibers having appropriate lengths and having opposite group velocity dispersion characteristic so that the total dispersion in one fiber is substantially matched and canceled by the total dispersion in the connected fiber. While this is a possible solution, the length of compensating fibers are impractically long.

Use of Fabry-Perot etalon in transmissive and reflective structure for dispersion compensation is discussed in a paper by L. J. Cimini, I. J. Greenstein, and A. M. Saleh, "Optical Equalization to Combat the Effects of Laser Chirp and Fiber Dispersion", IEEE J. of Lightwave Tech. LT-8, Page 649 (1990). The authors' technique requires continuous monitoring and tuning and appropriate means of feedback for dispersion compensation and optical equalization.

A. H. Gnauck, R. M. Jopson, and R. M. Derosier, "10-Gb / s 360-km transmission over dispersive fiber using midsystem spectral inversion", IEEE Photonics Technology Letters Vol. 5 No. 6 Page 663 (1993) utilize mid-point spectrum inversion technique by means of the nonlinear optical effects in fibers to compensate for pulse distortion. Gnauck et al and Cimini et al methods are complicated and do not lend itself to reliable practical commercial systems.

The present invention compensator has several advantages over prior arts. Unlike others, the present compensator corrects polarization as well as chromatic dispersion. The discussed prior arts either are too complicated to implement or have excessively high loss or impractically long lengths. The present invention is simple, low cost, compact, broad band, and low loss which lends itself to commercial utilization. A second application of the present invention is related to optical pulse compression. Optical pulse compression for producing picosecond and subpicosecond laser pulses has become of great interest in recent years. A traditional method to compress optical pulses is to employ a pair of diffraction gratings. E. B. Treacy. "Optical Pulse Compression with Diffraction Gratings", IEEE Journal of Quantum Electronics Vol. 5 Page 454 (1969) discusses a controllable group delay of a grating pair to overcome the inherent negative chirp of the picosecond pulses from a passively mode locked Nd-Glass laser. While grating pair method is effective, it suffers from high loss that may be unacceptable penalty for many practical applications.

As a pulse compressor for laser systems, unlike other methods, the present invention is low loss and simple and can compress positively chirped as well as negatively chirped optical pulses.

In some applications, such as shod optical pulse amplification, a pulse is intentionally broadened by means of frequency chipping. The frequency chirped pulse is amplified and, subsequently, time compressed. The reason for initial broadening of the pulse is to obviate the saturation effects in the optical amplifier, due to high optical pulse power density. The present invention is relevant in both initial pulse broadening and subsequent pulse compression in optical amplifiers.

SUMMARY OF THE INVENTION

It is accordingly a primary object of the present invention to provide a method and means of compensation of chromatic and polarization dispersion and laser frequency chirp in optical fibers in order to increase data rate in fiber optic communication systems.

It is another object of the present invention to provide a method and means of optical pulse compression.

It is also object of the present invention to provide a chromatic and polarization dispersion and laser chirp compensator with optical gain for fiber optics applications.

Yet another object of the present invention to provide a light pulse compressor which has optical gain.

To increase information capacity of a fiber optic communication link, a chromatic and polarization dispersion and laser frequency chirp compensator is utilized. The applicants provide a chromatic dispersion and frequency chirp compensator by combining a wavelength to polarization transformer element with a polarization to delay converter element having a dispersion characteristic of substantially equivalent in magnitude, and opposite in sign, to the desired amount of dispersion and frequency chirp to be compensated. The wavelength to polarization transformer element alters each wavelength component of an input light pulse to different state of polarization. By performing the polarization transformation, it is possible to exploit the larger opposite dispersion in the polarization to delay converter element to counteract the chromatic dispersion and transmitter frequency chirp. It is noted that the compensation of dispersions and laser chirp may be done before, during, or after exposure to the undesirable effects. Optical gain may be incorporated in any of the elements of the compensator which makes the present invention a light amplifier as well as a compensator. Any elements of the present invention may be of bulk optics or guided wave type. Furthermore, any elements of the present invention may be of passive or active in nature. The present invention is also applicable as an optical pulse time compressor that compresses a relatively long width optical pulse to a short width pulse.

The light pulse leaving the polarization to delay converter element of the compensator is partially depolarized. In one embodiment a repolarizer (or depolarizer) is placed following the polarization to delay converter element in order to have a polarized (or depolarized) compensated output.

In other embodiment, a polarization controller is placed before the wavelength to polarization transformer in order to convert an input lightwave to a linearly polarized light of proper orientation to substantially eliminate any dispersion and frequency chirp distortions.

Yet other embodiment of the present invention includes the use of a depolarizer before the wavelength to polarization transformer element and a repolarizer after the polarization to delay converter element in order to substantially exclude the effects of depolarization in an input light pulse. This embodiment of the invention balances the undesirable polarization dispersion in addition to unwanted chromatic dispersion and frequency chirp of an input lightwave.

Still another embodiment of this invention includes a polarization beam splitter and a polarization beam combiner on the ends of two compensators operating in parallel. This embodiment of the present invention compensates polarization dispersion as well as chromatic dispersion and frequency chirp of an input pulse.

Optical gain may be included in any stages of the compensators of the present invention. In addition, the nature of any elements of the present invention may be passive (birefringent fiber) or active (Ti:LiNbO3 waveguide with electrodes and voltage source).

DETAILED DESCRIPTION

Optical fibers present themselves as potentially high data rate communication links. However, deleterious effects such as chromatic and polarization dispersion and laser frequency chirp may diminish the usefulness of this potential large information capacity of the optical fiber links.

Semiconductor lasers are used in pulsed mode in telecommunications to transmit data over fiber optic cables. Pulsed lasers may suffer from frequency chirp. Frequency chirp occurs when the frequency (or wavelength) of the source varies as a function of time during the pulse excitation. In other words, some frequencies (or wavelengths) components in the pulse are emitted earlier than the others in the light pulse. Chromatic dispersion in fiber has the effect of delaying certain wavelengths (or frequencies) components of an input beam with respect to the other components. In effect, a light pulse suffering from chromatic dispersion is similar to frequency chirped pulse because each wavelength component is delayed differently with respect to each other. For this reason, the present invention treats the frequency chirp and chromatic dispersion in the same way. These deleterious effects in communication systems limit the bandwidth of the fiber links by broadening the optical pulses thereby reducing the bit rate of data signals.

In some applications, like short optical pulse amplification, a short pulse is intentionally broadened through frequency chirping and then amplified in order to avoid saturation effects of the optical amplifier. The amplified frequency chirped optical pulse is subsequently compensated (compressed) to produce the short optical pulse. The present invention is applicable as a pulse stretcher as well as a pulse compressor.

In accordance with the principles of the present invention, fiber chromatic and polarization dispersion and source frequency chirp may be substantially compensated. The present invention transforms (conditions) each wavelength component of a linearly polarized beam to different states of polarization. Different states of polarization experience different delay in such a fashion that slow components catch up with fast components, hence, causing the pulse to compress.

Figure 1:
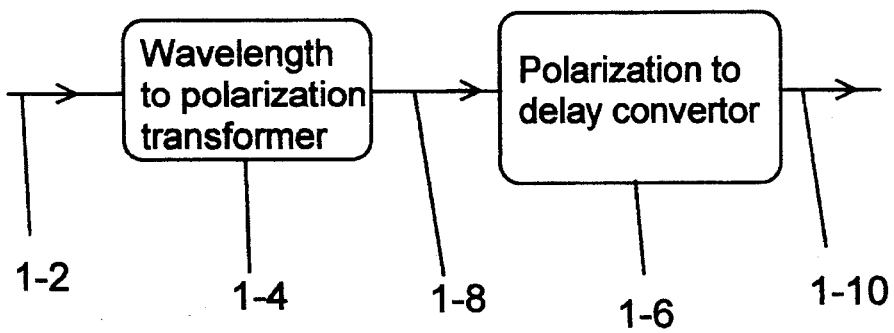
FIG. 1 schematically illustrates a block diagram embodiment of the present invention.
Figure 2:
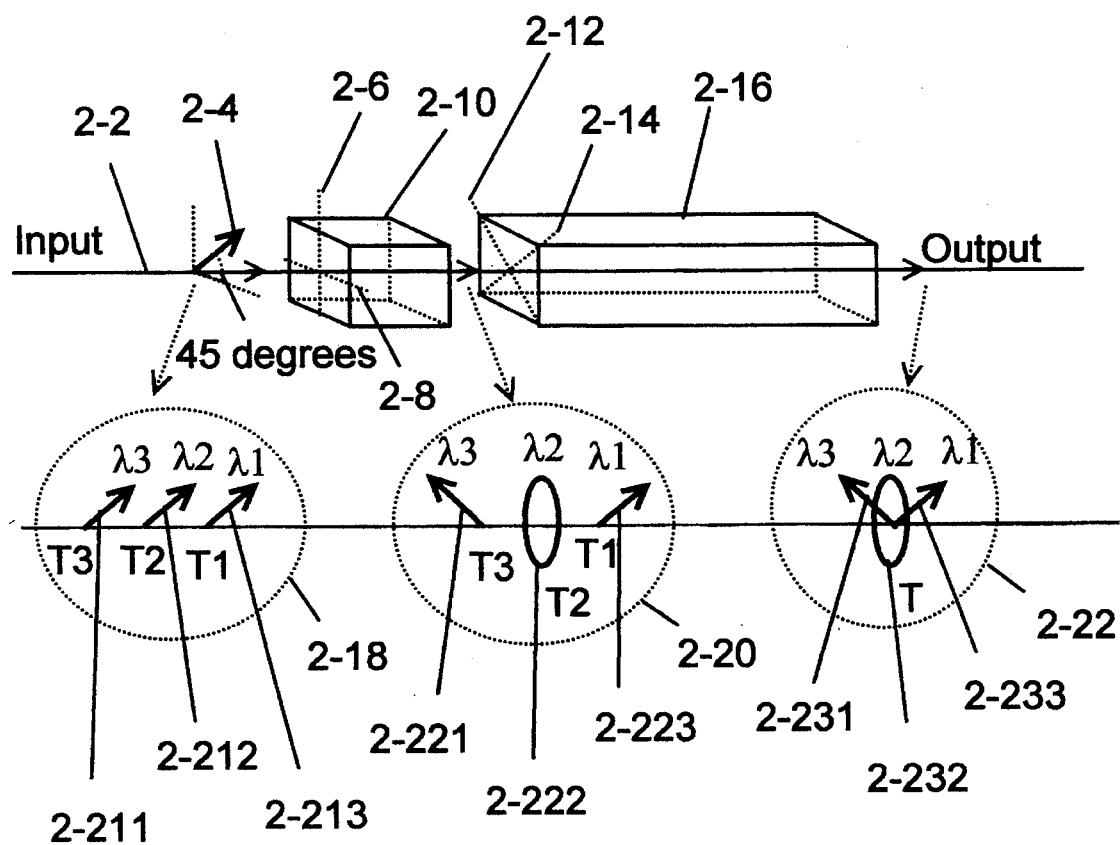
FIG. 2 shows an embodiment of the present invention with birefringent elements.

FIG. 1 illustrates in block diagram form an embodiment of the compensator of the present invention. The compensator consists of two stages 1-4 and 1-6. A linear polarized light 1-2 suffering from chromatic dispersion and frequency chirp is conditioned in the first stage 1-4 of the compensator in such a way that each wavelength component of the input beam is converted into different states of polarization. The second stage of the compensator 1-6 has different time delay for each state of polarization. The time delay in the second stage of the compensator is selected (or adjusted) so that the slow wavelength components in the lightwave overtake the fast components of the beam, thereby compressing the input pulse. FIG. 2 illustrates an embodiment of the present invention. A polarized input beam 2-2 suffering from frequency chirp and chromatic dispersion is illustrated in 2-18. For simplicity and better illustration, with no loss of generality, only three wavelength components of the input pulse are shown. $\lambda 1$ is the least delayed wavelength and $\lambda 3$ is the most delayed wavelength while $\lambda 2$ has a delay equal to average of $\lambda 1$ and $\lambda 3$.

Wavelength components $\lambda 1$, $\lambda 2$, and $\lambda 3$, shown in 2-18, are delayed differently in time due to chromatic dispersion in a fiber or frequency chirp of a laser source. The input beam 2-2 is linearly polarized with its polarization axis 2-4 making an angle approximately 45 degrees from the principal axes 2-6 and 2-8 of a birefringent element 2-10. The birefringent element 2-10 transforms each wavelength component (of the same polarization) of the input beam into different states of polarization. This is depicted in the bubble 2-20 where $\lambda 1$ is linearly polarized in the original polarization state while $\lambda 2$ is circularly polarized and $\lambda 3$ is linearly polarized orthogonal to $\lambda 1$. Although, the state of polarization of each wavelength component has changed, the time delay between them remains essentially unchanged as shown in the bubble 2-20. This conditioned light enters a birefringent element 2-16. The principal axes of the element 2-16 are angled approximately 45 degrees from the principal axes of the birefringent element 2-10. The birefringent element 2-16 causes each state of polarization (hence each wavelength component) to experience different delays in such a way that slow wavelength components can catch up with the fast components, thereby compressing the pulse. This may be achieved, as shown in FIG. 2, by orienting the slow (higher index of refraction) axis of the birefringent element 2-16 along with the least delayed wavelength component $\lambda 1$. The most delayed wavelength component $\lambda 3$ is oriented along the fast axis (lower index of refraction) of birefringent element 2-16 so that it can catch up with $\lambda 1$, provided that the length of element 2-16 is selected properly. The intermediate delayed wavelength $\lambda 2$ is circularly polarized and experiences an average of $\lambda 1$ and $\lambda 2$ delays. Consequently, $\lambda 2$ and $\lambda 3$ are caught up with $\lambda 1$ upon going through the birefringent element 2-16, as depicted in the bubble 2-22, and the input pulse is compressed. It is essential, for pulse compression, that the slow axis of the birefringent element 2-16 to be oriented along the polarization axis of the least delayed wavelength component. It is equally important that the fast axis of the birefringent axis 2-16 be oriented along the polarization axis of the most delayed wavelength components of the light pulse.

Figure 3:
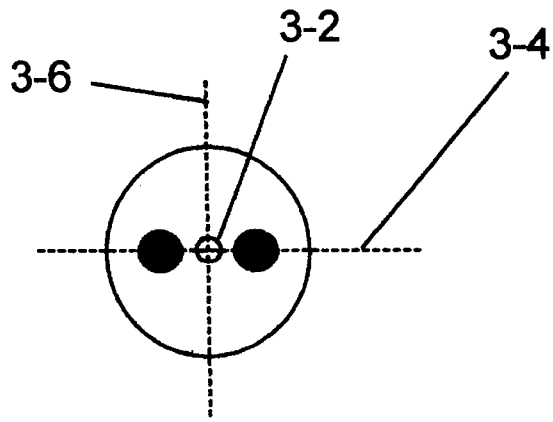
FIG. 3 depicts a cross section and principal axes of a birefringent fiber.

Birefringent fibers and planar waveguides constitute excellent media to realize the compensator of the present invention. An example of birefringent waveguide is planar optical waveguides made from a die of LiNbO3 (Lithium Niobate) having diffused Ti (titanium) waveguide (Ti:NbO3) which exhibit linear birefringent. FIG. 3 shows a cross section of a birefringent fiber with the core 3-2 and principal axes 3-4 and 3-6.

Figure 4:
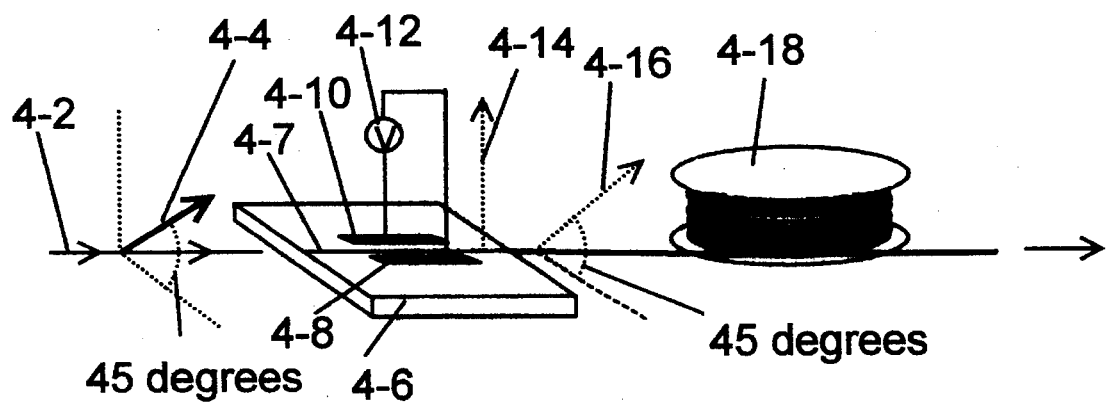
FIG. 4 shows a birefringent integrated optics waveguide pigtailed to a birefringent fiber with their principal axes approximately 45 degrees from each other and means of birefringence adjustment of the integrated optics waveguide in accordance with the principles of the present invention, FIG. 5 schematically illustrates another block diagram embodiment of the present invention.

FIG. 4 illustrates an embodiment of the present invention utilizing a Ti:LiNbO3 planar waveguide 4-7 and a birefringent fiber 4-18. The planar waveguide 4-7 is formed on a die of LiNbO3 4-6. The polarization axis 4-4 of a beam 4-2 makes an angle approximately 45 degrees from the principal axis 4-14 of the birefringent planar waveguide 4-7. The planar waveguide 4-7 is used as wavelength to polarization transformer. Electrodes 4-8 and 4-10 and a voltage source 4-12 provide a means for adjustment of the polarization mode delay of the waveguide 4-7. A birefringent fiber 4-18 is used as the polarization to delay converter. The fiber 4-18 is pigtailed to the planar waveguide 4-7 as shown in the FIG. 4. The principal axis 4-16 of birefringent fiber 4-18 is approximately 45 degrees from the principal axis 4-14 of planar waveguide 4-7 in the neighborhood of the pigtail.

Figure 5:
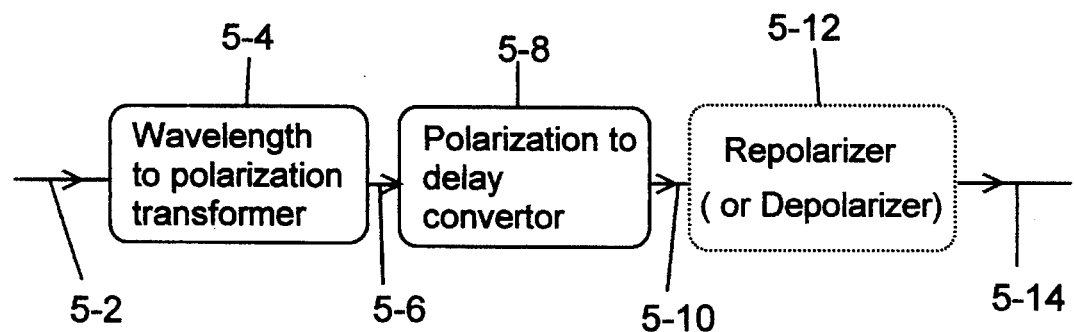

In all discussed embodiments of the present invention, as described in the FIGS. 1, 2, and 4, the output pulse has been compressed (compensated), however, partially depolarized. Some applications demand either totally polarized or totally depolarized output pulse. To address these applications, a repolarization or depolarization stage is added to the two aforementioned stages of the compensator of the present invention. FIG. 5 shows in block diagram form of yet another embodiment of the compensator of the present invention where a repolarizer or depolarizer stage 5-12 is placed after the polarization to time delay converter element. A polarized output beam is desirable when the outputs of two compensaters are to be combined by means of a polarization beam combiner. The depolarizer stage may be useful in applications where polarization sensitive elements are involved.

Figure 6:
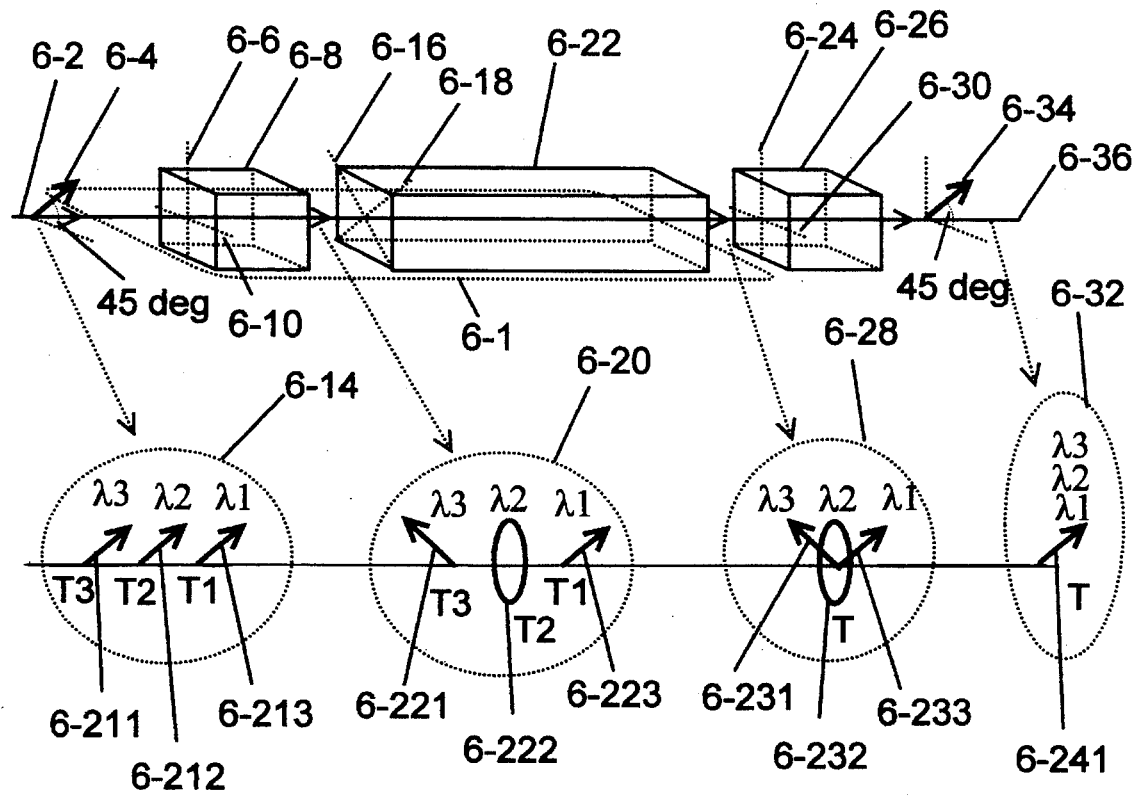
FIG. 6 shows an embodiment of the dispersion and frequency chirp compensator with a repolarizer (or depolarizer) stage in accordance with the principles of the present invention, FIGS. 7–9 schematically illustrate various block diagram embodiments of the present invention.

FIG. 6 illustrates an embodiment of the compensator of the present invention with a repolarizer (or depolarizer) stage 6-26. The compensator 6-1 (as described in FIG. 2) has the wavelength to polarization transformer element 6-8 and polarization to delay converter element 6-22. The polarization to delay element 6-22 is followed by a birefringent element 6-26. The principal axes of the element 6-26 are approximately parallel to the principal axes of the element 6-8. Furthermore, the polarization mode delay of the elements 6-26 is substantially equal to polarization mode delay element 6-8. In the case that the element 6-26 to be used as repolarizer, the principal slow axis of the element 6-26 is parallel to the fast principal axis of the element 6-8. The output beam 6-36 would emerge as polarized radiation as shown in the bubble 6-32 if the repolarization element is employed. In the case that the element 6-26 to be used as depolarizer, the slow principal axis of the element 6-26 is approximately parallel to the slow principal axis of the element 6-8.

Figure 7:
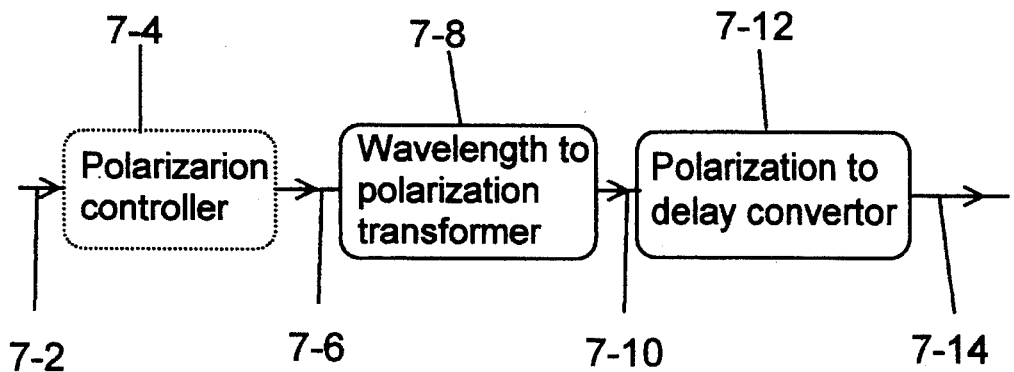

In the case that the input beam to be compensated is polarized but not linearly polarized, a polarization controller may be employed. FIG. 7 shows another embodiment of the present invention. A polarization controller 7-4, as shown in FIG. 7, changes a polarized (elliptically) input beam 7-2 to a linearly polarized beam 7-6 of proper orientation for the element 7-8 to achieve the pulse compensation.

Figure 8:
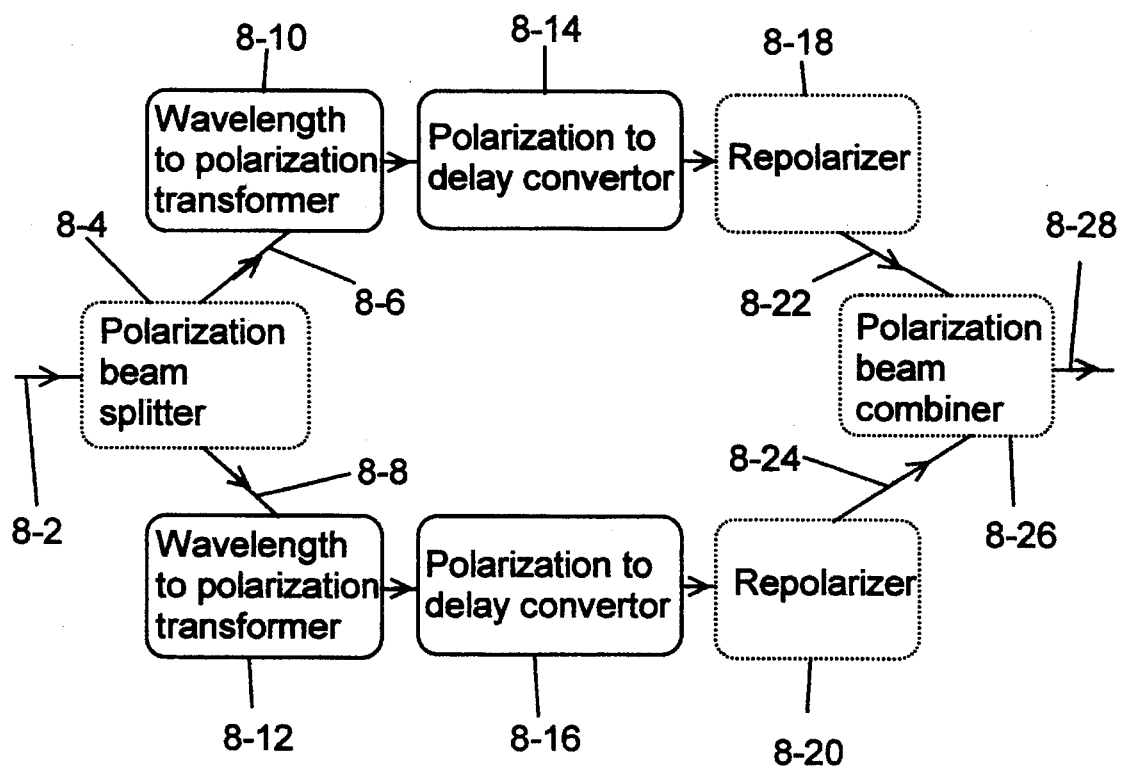

The compensators described so far allow one to compress (compensate) a polarized beam. However, the compensator of FIG. 8, still another embodiment of the present invention, provides the compensation regardless of the polarization state of an input beam (elliptical or partially polarized). An input beam of light 8-2 is split by a polarization beam splitter 8-4 into two orthogonally polarized beams 8-6 and 8-8. The polarized beam 8-6 is compensated into polarized beam 8-22 through compensator repolarizer stages 8-10, 8-14, and 8-18. Similarly, the polarized beam 8-8 is compensated into polarized beam 8-24 through stages 8-12, 8-16, and 8-20. The two orthogonally polarized and compensated beams 8-22 and 8-24 are combined into a single beam 8-28 by means of polarization beam combiner 8-26. The output beam 8-28 is polarized and compensated. This embodiment (FIG. 8) of the present invention has the advantage (over FIGS. 1, 2, 4, 5, 6, and 7) that it can compensate polarization dispersion in addition to chromatic and frequency chirp.

Figure 9:
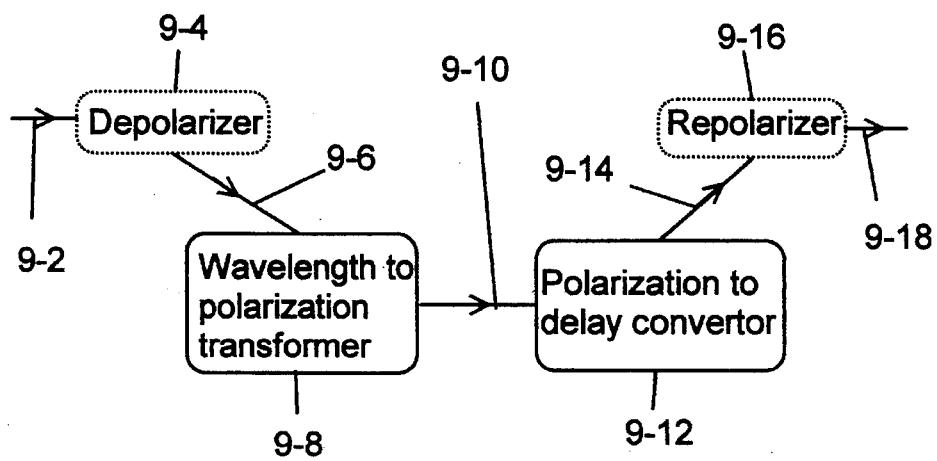

FIG. 9 illustrates yet another embodiment of the present invention relevant for polarization and chromatic dispersion and frequency chirp compensation. A beam 9-2 is depolarized into beam 9-6 by a depolarizer element 9-4. The depolarized beam 9-6 consists of two orthogonally polarized pulses with no correlation between them. The two components in 9-6 are compensated into a beam 9-14 by means of elements 9-8 and 9-12, as shown in FIG. 9. The Beam 9-14 consists of two compensated orthogonally polarized light pulses with no correlation between them. A repolarizer stage 9-16 of proper delay can repolarize the depolarized beam 9-14 into a polarized beam 9-18.

Figure 10:
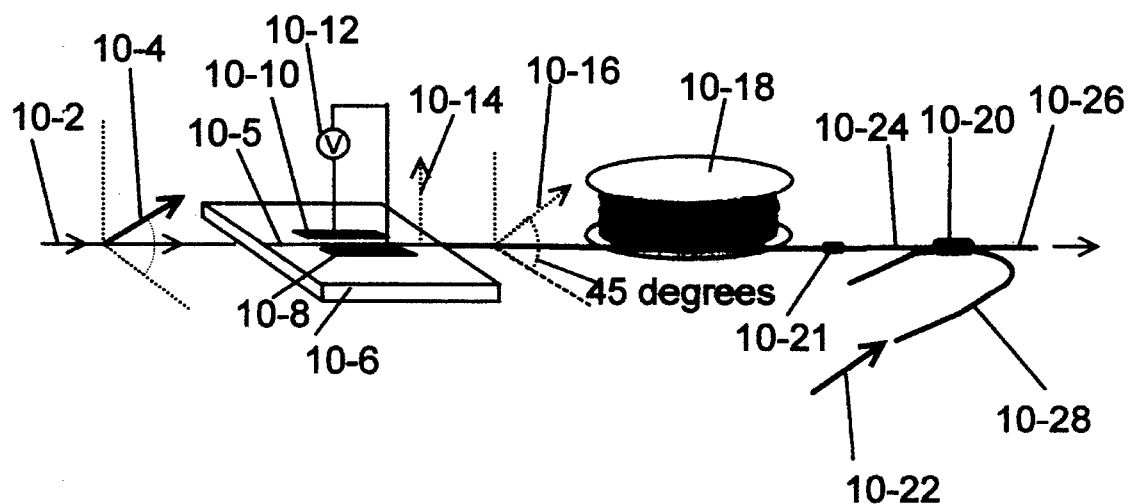
FIG. 10 shows an embodiment of the chromtic dispersion and frequency chirp compensator where optical gain is incorporated in the present invention.

Any elements of the present invention may be of passive or active type. Furthermore, optical gain may be incorporated into any stages of the compensator or repolarization (depolarization) stage of the present invention. FIG. 10 shows an exemplary embodiment of the present invention where optical gain is incorporated in the polarization to delay stage of the compensator. A linearly polarized beam 10-2 with polarization axis 10-4 is coupled into a birefringent integrated waveguide 10-5 which is formed on a substrate 10-6. The principal axis 10-14 of waveguide 10-5 is approximately 45 degrees from the polarization axis 10-4. The electrodes 10-8 and 10-10 and the voltage source 10-12 provide a means for adjustment of the polarization mode delay of the waveguide 10-5. The birefringent waveguide 10-5 is the wavelength to polarization transformer element. A birefringent fiber 10-18 is used as polarization to delay converter element. The fiber 10-18 is pigtailed to the waveguide 10-5. The principal axis 10-16 of the birefringent fiber 10-18 is approximately 45 degrees from the principal axis 10-14 of the waveguide 10-5 in the neighborhood of the pigtail. The birefringent fiber 10-18 may include impurities where upon excitation provide optical gain for the compensated pulse. Examples of impurities are ions such as Erbium or Praseodymium or Neodymium. These ions produce optical gain in the fiber 10-18 when they are optically excited. A wavelength sensitive coupler 10-20 is connected to the output end of the birefringent fiber via a fiber splice 10-21. The coupler 10-20 is selected so that pump excitation 10-22 is coupled into the birefringent fiber 10-18 from coupler port 10-28 to coupler port 10-24 while the output compensated pulse is coupled from coupler port 10-24 into coupler port 10-26. The output light pulse, exiting the port 10-26, is compensated and has experienced optical gain. Therefore, the compensator with optical gain constitutes a novel apparatus that addresses the two foremost limiting factors in telecommunications, namely, fiber loss and dispersion distortion.

What is claimed is:

1. Apparatus for compensating a predetermined amount of chromatic dispersion and polarization dispersion and frequency chirp in a lightwave signal, the apparatus comprising:

first means for transforming each wavelength component of the lightwave to different respective polarization states; and second means to convert each different respective polarization state to a different respective time delay and wherein said second means to convert is connected to an output of the first transforming means for compensating chromatic dispersion and frequency chirp of the lightwave by inducing an amount of chromatic dispersion substantially equal in magnitude, and opposite in sign, to the predetermined amount of chromatic dispersion and polarization dispersion and frequency chirp.

2. The apparatus as defined in claim 1 further comprising:

a means for amplifying the lightwave signal.

3. The apparatus as defined in claim 1 further comprising:

a means for controlling the polarization of the lightwave signal in order to produce a specific state of polarization and wherein said means for controlling the polarization is coupled to an input of the first means for transforming each wavelength component of the lightwave to different polarization state.

4. The apparatus as defined in claim 1 further comprising:

a means for repolarizing the lightwave signal and wherein said means for repolarization is connected to an output of the second means to convert each polarization state to a different respective time delay.

5. The apparatus as defined in claim 1 further comprising:

a means for depolarizing the lightwave signal and wherein said means for depolarization is connected to an input of the first means for transforming each wavelength component of the lightwave to different polarization state.

6. Apparatus for compensating a predetermined amount of chromatic dispersion and polarization dispersion and frequency chirp in a lightwave signal comprising:

first means to depolarize the lightwave signal; and second means for transforming each wavelength components of the lightwave to different respective polarization states and wherein said second means for transforming is connected to an output of the first depolarizer means; and third means to convert each polarization state to a different respective time delay for compensating chromatic dispersion and polarization dispersion and frequency chirp of the lightwave by inducing an amount of dispersion and frequency chirp substantially equal in magnitude, and opposite in sign, to the predetermined amount of dispersion and frequency chirp and wherein said third means to convert is connected to an output of the second means for transforming; and fourth means to repolarize the lightwave to a polarized light and wherein said fourth means to repolarize is connected to an output of the third means to convert each polarization state to a different respective time delay.

7. The apparatus as defined in claim 6 further comprising:

a means for amplifying the lightwave signal.

8. Apparatus for compensating a predetermined amount of chromatic dispersion and polarization dispersion and frequency chirp in a lightwave signal comprising:

a means to split the lightwave signal into two orthogonal polarization components; and couple each said polarization components into inputs of two compensators of the claim 4; and a means to combine two orthogonal polarization components connected to the outputs of two said compensators.

9. The apparatus as defined in claim 8 further comprising:

a means for amplifying the lightwave signal.

* * * * *